No. 607,628. Patented July 19, 1898.
J. REECE, Dec'd.
M. REECE & F. A. SHEA, Administrators.
MACHINE FOR FORMING IRREGULAR CAM GROOVES.
(Application filed Sept. 11, 1897.)
(No Model.) 2 Sheets—Sheet 2.
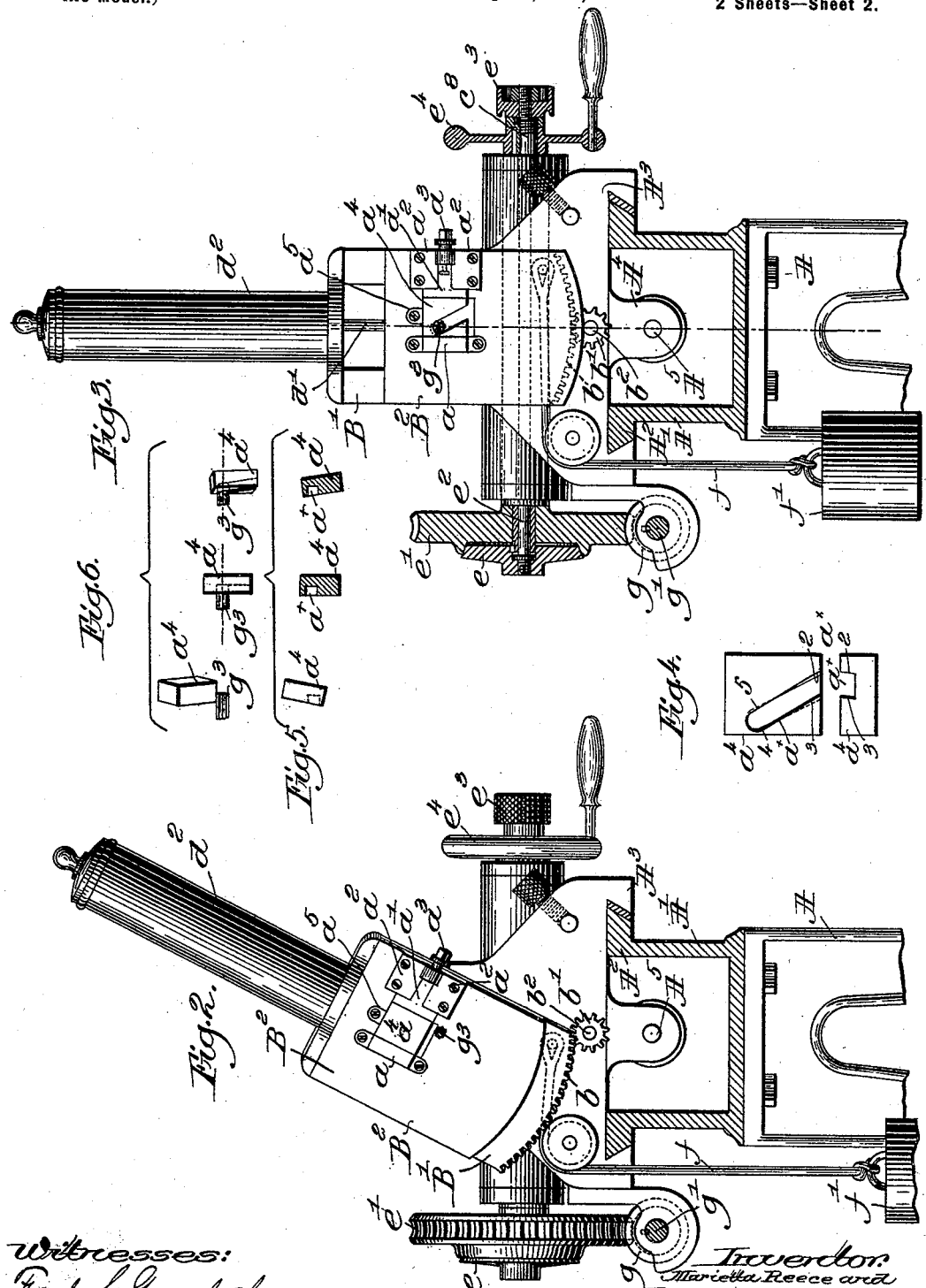

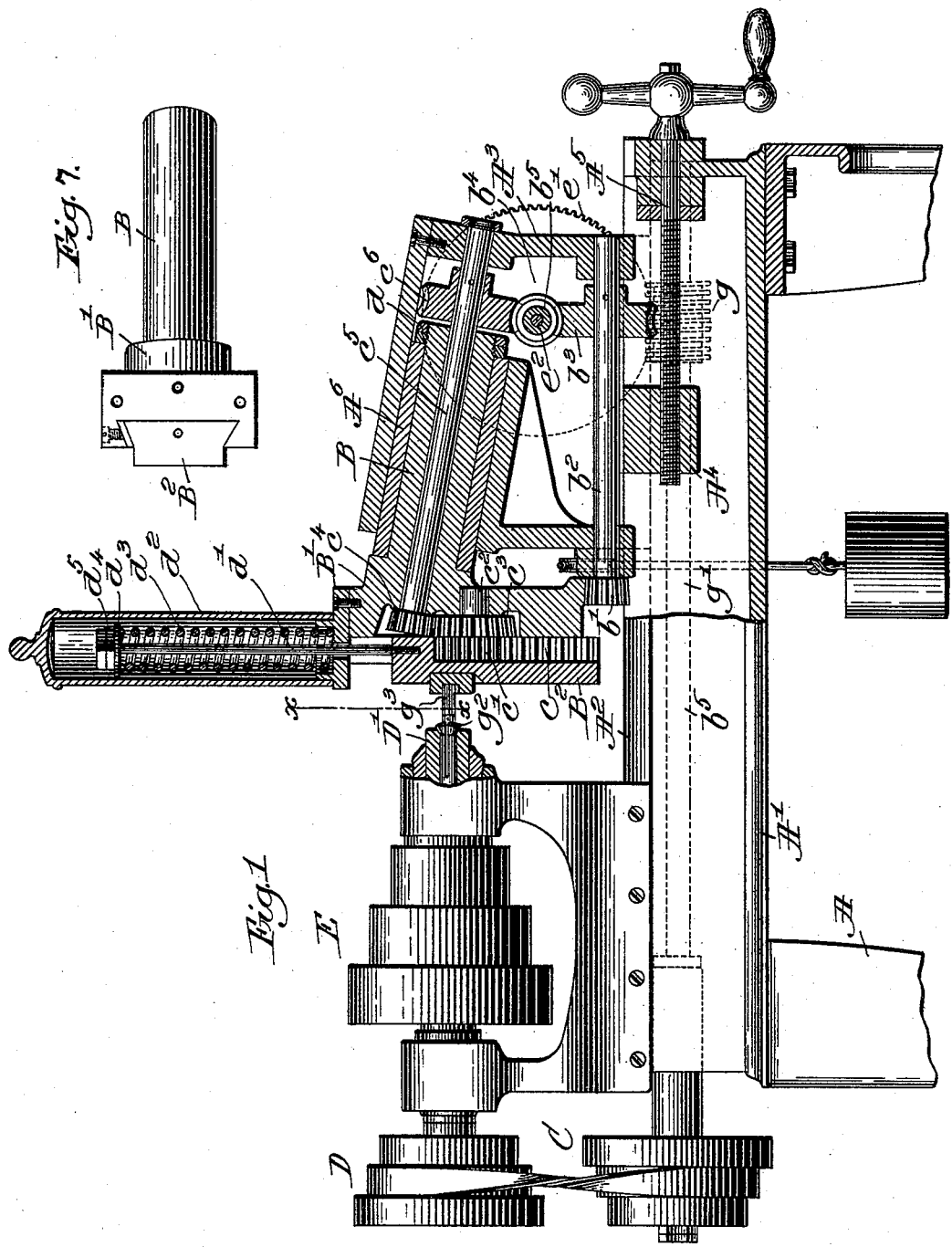

UNITED STATES PATENT OFFICE.

MARIETTA REECE AND FRANCIS A. SHEA, OF BROOKLINE, MASSACHUSETTS, ADMINISTRATORS OF JOHN REECE, DECEASED.

MACHINE FOR FORMING IRREGULAR CAM-GROOVES.

SPECIFICATION forming part of Letters Patent No. 607,628, dated July 19, 1898.

Application filed September 11, 1897. Serial No. 651,282. (No model.)

*To all whom it may concern:*

Be it known that JOHN REECE, deceased, late of Brookline, Massachusetts, invented an Improvement in Machines for Forming Irregular Cam-Grooves, of which the following description, in connection with the accompanying drawings, is a specification, like letters and figures on the drawings representing like parts.

In the manufacture of sewing and other machines it frequently happens that a lever or shaft has to be rocked by means of a pin or projection entering into a cam which slides in a fixed path, and in order to adapt this cam to properly operate at all times the walls of the cam are somewhat inclined, so that they may operate in all positions of the cam on the pin or projection.

Figure 1 is a side elevation, partially in section, of a machine embodying this invention. Fig. 2 is an elevation of that part of the machine to the right of the dotted line $x$, Fig. 1. Fig. 3 is a similar view, but somewhat broken out, showing the movable head in another position. Fig. 4 shows in face and edge view the cam-block having a groove such as the machine herein to be described cuts. Fig. 5 shows several different views of the block and the groove which this machine is adapted to cut, said views being shown to illustrate the variation in the cam-path. Fig. 6 shows the milling-tool with the block to be cut, showing progressively the different presentations of the block to the milling-tool; and Fig. 7, a top view of the head and the carriage in it.

The framework of the machine consists, essentially, of legs A, upon which is mounted a bed A', said bed being provided at its upper edge with suitable dovetailed or other ways $A^2$, on which slides a carriage $A^3$, to be described, said carriage having a nut $A^4$, which is entered by the threaded part of a screw $A^5$, having bearings in the bed and restrained from longitudinal movement, although free to be rotated therein by hand, the rotation of said screw-shaft enabling the carriage to be moved longitudinally in order to put it into proper working position and to move it from working position into its abnormal or inoperative position when left at rest.

The carriage $A^3$ is provided with a chamber which may be rectangular in cross-section and inclined from a horizontal plane to receive a guide-block $A^6$, shaped externally to fit the shape of the inclined recess. This box has an opening to receive a round tubular sleeve or extension B, extended angularly from a head B', said head having applied to its outer face a carriage $B^2$, provided with block-holding jaws $a$ and $a'$. The jaw $a$ is fixed, the jaw $a'$ is movable, and the shank of the movable jaw is fitted to slide between lugs $a^2$, fixed to the face of the head, said movable jaw being under the control of a suitable adjusting-screw $a^3$, which may be turned to effect the clamping or releasing of the block $a^4$, which is to be provided with the peculiar groove $a^\times$, herein to be described. The face of the head has a connected stop $a^5$, against which is placed the end of the block, said stop being made of hardened steel to prevent wear of the parts. The head is provided at its lower edge with a toothed sector $b$, which is engaged by a bevel-gear $b'$, fast on a shaft $b^2$, having its bearings in the carriage $A^3$, said shaft having a worm-toothed gear $b^3$, which is engaged and rotated constantly while the cam-groove is being cut by a worm $b^4$, fast on a hollow shaft $b^5$.

The block-holding carriage $B^2$ in the operation of this machine must be moved vertically on or with relation to the head, it in operation being lowered from the position Fig. 2 into the position Fig. 3, and to do this the carriage has extended backwardly from it dovetailed projections, (see Fig. 7,) which enter behind and engage suitable dovetailed guides or ways fixed on or with relation to the head, and one of these projections of the carriage is provided with a series of rack-teeth $c$, (see Fig. 1,) which are engaged by a toothed gear $c'$, mounted on a stud $c^2$ in the head, said stud having also fixed to it a toothed gear $c^3$, which is engaged by the toothed gear $c^4$ on a shaft $c^5$, extended through the said shank B and provided with a worm toothed gear $c^6$, which is also engaged and rotated by the worm $b^4$ on the shaft $b^5$. The same worm $b^4$, therefore, by its movement controls the rotation of the shafts $b^2$ and $c^5$, so that said two shafts by the gearing described connected with them impart the proper movements in unison to the carriage carrying the block to be provided with the cam-groove, so that said carriage is always positively and automatically uniformly controlled.

The sleeve B is maintained in the guide-block $A^6$ by means of a suitable nut $d$, screwed on the head of the said sleeve and abutting against the end of said guide.

To the upper end of the carriage carrying the block there is secured a rod $d'$, which is extended upwardly into a tube $d^2$, said rod being surrounded by a spiral spring $d^3$, the upper end of the rod having a suitable washer, as $d^4$, and a nut or head $d^5$ to bear on said spring, said spring acting normally to bear up on the carriage in opposition to the downward movement of the carriage produced by the action of the gear $c'$ on the rack $c$.

The hollow shaft $c^8$ has mounted loosely upon it at its left-hand end (see Figs. 2 and 3) a worm toothed gear $e'$, having a conical cavity in its face, which is entered by a conical washer or disk $e$, fixed upon a rod $e^2$, extended through said hollow shaft to its opposite end, where said rod has screwed upon it a friction-nut $e^3$. The end of said hollow shaft next said friction-nut is provided with a thread and receives upon it a hand-wheel $e^4$. When the machine is in regular operation, the said nut $e^3$ is turned up so tightly upon the threaded end of the rod $e^2$ that the end of said set-nut working against the end of the hollow shaft forces the cone-shaped disk or washer $e$ so firmly in contact with the worm toothed gear $e^2$ that the said worm toothed gear in its rotation moves the disk $e$ with it and causes the shaft $b^5$ and its attached worm $b^4$ to be moved continuously. The worm toothed driving-gear $e'$ is engaged by a worm $g$, fast on a shaft $g'$, arranged in suitable bearings at the side of the bed $A'$, said shaft having a suitable nest of pulleys C, over which in practice will be extended a crossed belt, which surrounds and is driven from the nest of pulleys D at the end of the spindle or chuck-shaft $D'$, provided with a suitable nest of pulleys E, which may be driven at any suitable speed in usual manner.

When it is desired to run the head back into its starting position, Fig. 2, the set-nut $e^3$ will be loosened, and when loosened it will destroy the adhesion between the disk $e$ and the worm toothed gear $e^2$, and thereafter by engaging the hand-wheel $e^4$ the shaft $b^5$, with its worm $b^4$, may be rotated to put the head back into its starting position without stopping the rotation of the shaft $g'$ and the spindle-shaft $D'$.

To avoid any backlash with relation to the lateral movement or swinging of the head, the head has attached to it a suitable rope $f$, having an attached weight $f'$.

The spindle-shaft $D'$ is hollow and receives through it any usual chucking-rod $g^2$, it receiving and holding the shank of the milling-tool $g^3$. This chucking-rod is not herein particularly illustrated, as it may be of any usual or suitable construction.

By changing the cross-belt from one to the other diameter of pulleys of the nest D and nest C the speed of the shaft $g'$ may be varied at pleasure according to whether rough or finished work is to be done.

The inclination of the shank B with relation to the head $B'$ and the inclination of the bore in the part $A^6$, receiving said shank, is such that when the head is in its normal or starting position, Fig. 2, the face of the elevated carriage $B^2$ stands in such a plane with relation to the center line of the spindle $D'$ as to make an obtuse angle.

In operation the block is put into the jaws with one end against the stop, (see Fig. 2,) and the carriage holding the block is put into its elevated position, and the right-hand end of the segment attached to the head (viewing Fig. 3) presents its teeth in engagement with the teeth of the gear $b'$. Now in this condition the face-plate stands at an acute angle, as stated, with relation to the longitudinal center of the spindle $D'$, and the milling-tool attacks the lower end of the block, and as the head is turned by the gear $b'$ the carriage $B^2$ is gradually lowered and the head is swung over toward the right in Fig. 3, causing the milling-tool to cut a diagonal slot in the block, and by the time that the head arrives at substantially its lowest position, as in Fig. 3, the face of the carriage $B^2$ is at right angles to the center line of the milling-tool, and by moving the head a little farther the face of the carriage stands at an acute angle with relation to the center of rotation of the spindle $D'$, and it is by this change of position of the head and the carriage carrying the block that the block is so presented gradually to the milling-tool that the tool cuts a slot the sides of which are at an angle other than a right angle to the face of the block, thus making, as it were, a slot one wall of which may be undercut, and the other wall of the slot is parallel substantially therewith, and this undercut may be made at one and then at the opposite side of the slot in one continuous operation. The center of rotation of the sleeve B is out of line with the center of rotation of the shaft $D'$.

In the drawing Fig. 4 it will be seen that the side wall 2 at the commencement of the open end of the slot $a^\times$ forms with the face of the block $a^4$ a somewhat obtuse angle, whereas the wall 3 forms with the face of the block an acute angle, but at the point 4 the wall 3 presents an obtuse angle, whereas at the opposite side 5 the wall presents an acute angle with relation to the face of the block.

Referring to Fig. 5, the dotted line in the detailed figure at the left shows the relative position of the face-block $a^4$ with relation to the longitudinal center of the tool $g^3$, and the second and third details of Fig. 5 show sections of the block in different stages of the cutting slot, and the angular position of the slot with relation to the face of the block is therein fully shown and illustrated.

Having described the invention, what is claimed, and desired to be secured by Letters Patent, is—

1. In a machine for cutting cam-slots, the following instrumentalities, viz: a rotatable spindle, means to receive and hold a milling-tool; a pivoted head, a plate-holding carriage mounted on said head; means to rock said head; and means to slide the said carriage on said head, substantially as described.

2. The pivoted head provided with a segmental rack, and a plate-holding carriage mounted on said head and provided with a rack, combined with gears, and means to actuate them, to both rock said head and to slide said carriage thereon, substantially as described.

3. In a machine for cutting cam-slots, a rotatable spindle having a milling-tool, a head having a track for a carriage and provided with a sleeve extended therefrom at an angle to the length of said track, means to hold said sleeve in an angular position, a carriage mounted on said head, and means to move said carriage thereon, combined with means to oscillate said head, the sleeve referred to being extended from said head and being so supported that when the said head is started to be rocked the face of the carriage at the commencement of the rocking movement stands at an obtuse angle with relation to the longitudinal center of the tool-holding shaft and gradually assumes a position at right angles to said shaft, substantially as described.

4. The head having a toothed sector, a carriage mounted thereon and provided with rack-teeth; pinions engaging said toothed sector and said rack-teeth; two shafts carrying said pinions, a worm toothed gear on each of said shafts, and a worm for actuating both of said toothed gears, substantially as described.

5. In a machine for cutting cam-slots, the carriage having an angular chamber, a head having an angular sleeve entered within said chamber, a carriage mounted on ways of the said head, a spring to normally elevate said carriage on said head, a shaft $C^5$, means to actuate it, and means between it and said carriage to move said carriage on said head in opposition to said spring, substantially as described.

6. In a machine of the class described, a sliding carriage having jaws to hold a block to be provided with a cam-slot, a head having ways on which said carriage may be slid, a rotating shaft, as $c^8$, devices between it and said head to rock it, and also to slide said carriage on said head, a worm toothed gear loose on said shaft, means to actuate said worm toothed gear, and a friction disk or clutch, and means to operate it whereby when the said clutch is not held firmly in engagement with the said worm toothed gear, the shaft $c^8$ is held at rest, and when the said disk is in engagement with the said worm toothed gear the shaft $c^8$ is rotated to operate the machine, substantially as described.

In testimony whereof we have signed our names to this specification in the presence of two subscribing witnesses.

MARIETTA REECE,
FRANCIS A. SHEA,
*Administrators of John Reece, deceased.*

Witnesses:
GEORGE C. HILL,
FRANK L. CADY.